April 29, 1952  W. E. MOORE  2,594,672
PACKAGED REFRIGERANT
Filed Jan. 12, 1948
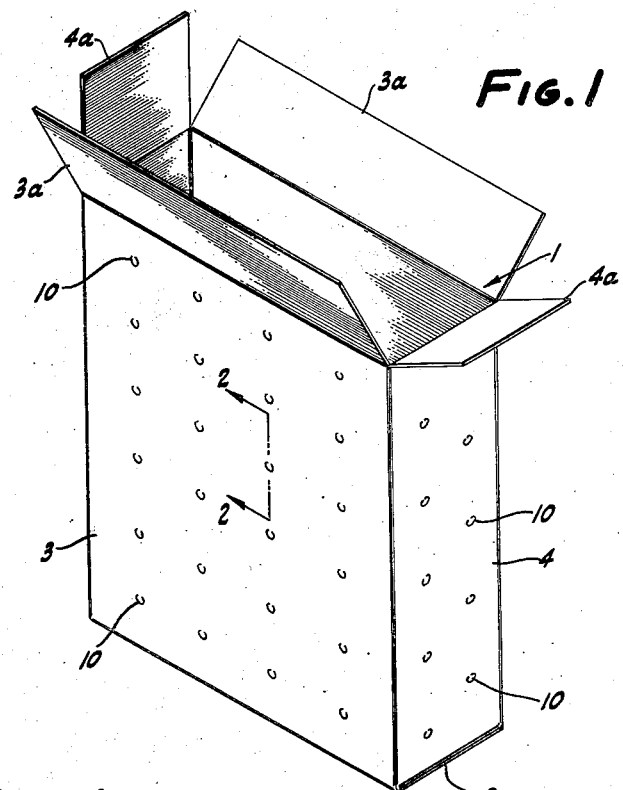
FIG.1
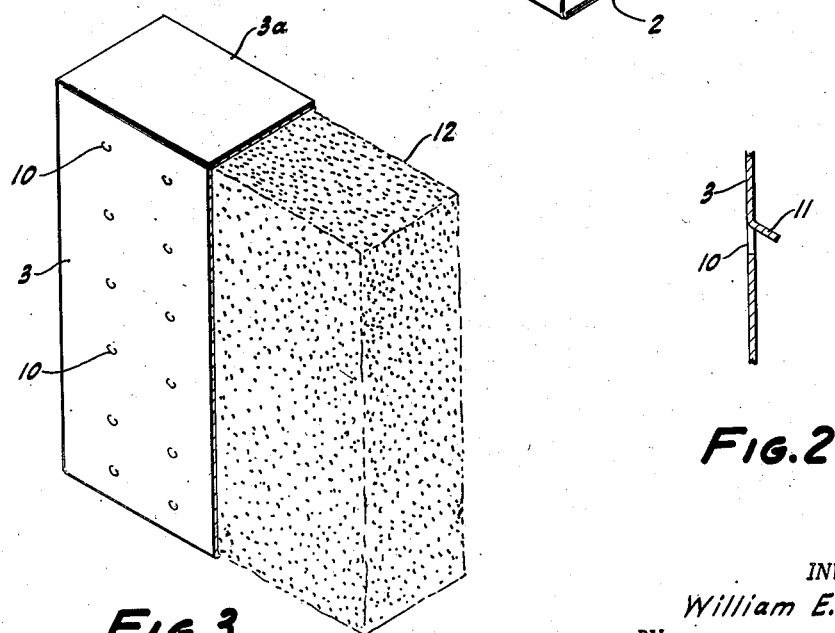
FIG.3
FIG.2
INVENTOR.
William E. Moore
BY
Mellin + Hanscom
ATTORNEYS Patented Apr. 29, 1952

2,594,672

UNITED STATES PATENT OFFICE 2,594,672

PACKAGED REFRIGERANT

William E. Moore, Oakland, Calif.

Application January 12, 1948, Serial No. 1,752

5 Claims. (Cl. 62—1)

This invention relates to a packaged refrigerant, to a method of producing the same, and to a method of refrigerating perishable commodities.

As set forth in my Patent No. 2,210,946, issued August 13, 1940, there is provided a novel refrigerant for refrigerating perishable commodities. This novel form of refrigerant is in the form of a block or shaped article, composed of a finely divided absorbent material, such as sawdust, saturated with water or brine, and frozen so as to freeze the aqueous component. It this form, the block or shaped article assumes the temperature of the frozen water or brine and effectively refrigerates a perishable commodity. This form of refrigerant has the advantage over ice, in that, as the effective refrigerant (the frozen water or brine) melts, it is absorbed by the sawdust and the block shaped article retains its shape and does not give rise to leakage of water or brine.

In another of my patents, No. 2,302,639, issued November 17, 1942, there is described a method of effectively refrigerating perishable commodities, involving the use of my novel refrigerant in combination with a container, crushed or shaved ice and other elements therein described.

In the practice of the inventions set forth in the aforementioned patents, it has been a common procedure to mold the sawdust, with or without but preferably with a suitable binder, into the desired shape, then saturate the molded article with water or brine, and then freeze the molded, saturated article. This procedure is effective and the resulting refrigerant is efficient, but the procedure and the resulting article have several disadvantages. Thus, if a consumer using the refrigerant desires to maintain a supply of the molded, frozen blocks, he must provide a suitable cold storage facility. Alternatively, the consumer may maintain a supply of the molded blocks in unsaturated, unfrozen condition, but he must then provide facilities for saturating the blocks with water or brine and for freezing the saturated blocks as and when they are needed. In either event it will be seen that for the small or occasional consumer, the need for cold storage or molding and freezing facilities is bothersome.

It is among the objects of the present invention to provide a means whereby a shaped body of proper size and shape can be supplied in non-refrigerated condition, and which will allow refrigeration with a minimum of difficulty.

It is a further object of the invention to provide a means of supplying suitable shaped refrigerants of the type described and claimed in my Patent No. 2,210,946 above mentioned, in a form such as is more readily adapted to use without a binder, and such that the difficulties of melting and thawing of the shaped article are obviated.

These and other objects of the invention will be apparent from the ensuing description and the appended claims.

In accordance with my present invention, there is provided a water-proof container of the proper shape and dimensions. This container is provided with perforations of a size and number sufficient to accomplish the purposes set forth in detail hereinafter, and it is filled with sawdust or other suitable absorbent, finely divided material. When it is desired to produce the final refrigerant, this container with its content of sawdust or the like is immersed in a bath of water or brine for a sufficient time to saturate the sawdust with the water or brine, after which it is removed from the bath and the excess water or brine is allowed to drain off. The container is then immersed or placed in a suitable freezing unit to freeze the water or brine.

The invention will be better understood by reference to the accompanying drawings, in which:

Fig. 1 is a perspective view of a container such as used in accordance with the invention.

Fig. 2 is a vertical section along the line 2—2 of Fig. 1.

Fig. 3 is a perspective view of the packaged refrigerant of the invention with the container cut away to show the content of solids.

Referring now to the figures of the drawings, there is provided a container generally designated as 1, in the form of a conventional carton, such as used to package powdered soap. This container or carton consists of side portions 3, end portions 4 and their respective extensions 3a and 4a, which fold over to form the top and bottom closures of the container. Side portions 3 and the end portions 4 are provided with perforations 10. As shown in Fig. 2, each of these perforations is preferably formed by only partially punching out a circle, so as to leave an inwardly extending tab 11, which serves an important function explained hereinafter. Referring to Fig. 3, the article in the form in which it is marketed or used is filled with a body of sawdust, or the like, designated as 12.

It will be apparent that the container 1 may be of any size or shape, according to requirements, and that the method or means of closing the top and bottom portions may be other than as shown in Fig. 1. The material from which the container 1 is formed is preferably cardboard, and it is preferably provided on its outer surface with a suitable water-proofing coat or sizing, as well known in the art.

In producing the packaged refrigerant of the invention, sawdust or other similar finely divided, absorbent material is put into a suitable container, which has been previously punched to provide perforations 10. A binder may or may not be mixed with the sawdust, but preferably, the saw dust is free from a binder, inasmuch as the container 1 serves to hold the dry material together. The container containing the sawdust is then immersed in water or brine of a suitable concentration. Details of this procedure will be found in the above mentioned patents. After the sawdust has absorbed an adequate amount of water or brine, the excess, unabsorbed liquid is allowed to drain through the perforations 10. The package is then subjected to freezing in any suitable refrigerator so as to freeze the absorbed water or brine.

The tabs 11 produced by only partially punching out the perforations 10 and pushing the tabs inwardly, as explained above, have been found to be very useful in that they act as a sort of valve. Thus, they prevent or retard outflow of sawdust and retard the outflow of water or brine should the frozen mixture thaw and should there inadvertently be present an excess of liquid over that absorbed by the sawdust.

As stated, the packaged refrigerant of this invention may be used with or without a binder. When used with a binder, sodium silicate is preferred, but may be substituted, in whole or in part, by casein. Also, the brine used to saturate the sawdust preferably contains a small amount of sodium hydroxide, say one-third of an ounce for three gallons of water, to retard defrosting. The preferred brine used to saturate the sawdust is a calcium chloride brine, this being the cheapest in relation to reduction of freezing temperatures, and because it is harmless to most goods. However, other salts may be substituted for calcium chloride.

While in the preferred embodiment of the invention a more or less stiff, forming-sustaining container, is used, within the broader scope of the invention, any other porous container such as a paper or cloth bag may be used, a suitable porosity for purposes of this invention being specially provided, if necessary, as by punching out holes.

It is apparent that there has been provided a novel and very useful form of packaged refrigerant. According to the requirements or convenience of the consumer, the packaged refrigerant may be supplied to the consumer in its final saturated, frozen form, or it may be supplied in saturated but unfrozen form or merely in packaged form without being saturated. In the latter cases, the consumer can readily carry out the freezing or saturating and freezing steps.

While I have shown a preferred embodiment of the invention, it is to be understood that various changes may be made and will be apparent to those skilled in the art without departing from the principle of the invention which is set forth in the appended claims.

Having thus described my invention, what I claim and desire to obtain by Letters Patent is:

1. A disposable refrigerating unit comprising: a rectangular cardboard container; a body of finely divided material disposed in said container; inwardly opening check valves formed in the side walls of said container, said check valves permitting ingress of water into said container and preventing the egress of said finely divided material from said container.

2. In combination: a container; a body of finely divided material contained in said container; inwardly extending tabs punched from the side walls of said container and hinged thereto, said tabs serving as check valves to permit the ingress and egress of water into and from said container and to prevent the egress of said finely divided material from said container.

3. In combination: a rectangular container filled with a comminuted absorbent substance; downwardly directed inwardly extending tabs formed in the side walls of said rectangular container and hinged thereto, said tabs responding to a hydrostatic head when said rectangular container is submerged in a fluid to permit the ingress of said fluid into said rectangular container for absorption by said comminuted absorbent substance and to permit drainage of the excess fluid from said container.

4. In combination: a rectangular container filled with a comminuted absorbent substance; downwardly directed inwardly extending tabs punched from the side walls of said container and hinged thereto, the free ends of said tabs being arranged to move inwardly under a hydrostatic head to permit ingress of said water into said container for absorption by said comminuted absorbent substance.

5. The method of forming a disposable refrigerating unit comprising: filling a cardboard container having side walls formed with cut-out tabs, with a comminuted water absorbent material; immersing said container in a body of water to permit passage of water thereinto through the openings formed by the said tabs; removing said container from said body of water and permitting the excess water to drain therefrom through said openings; and finally freezing the water-content of said absorbent material.

WILLIAM E. MOORE.

REFERENCES CITED

The following references are of record in the file of this patent:

UNITED STATES PATENTS

| Number | Name | Date |
| --- | --- | --- |
| 1,727,878 | Griswold | Sept. 10, 1929 |
| 2,019,356 | Normelli | Oct. 29, 1935 |
| 2,087,966 | Clark | July 27, 1937 |
| 2,210,946 | Moore | Aug. 13, 1940 |
| 2,264,208 | Inman | Nov. 25, 1941 |

FOREIGN PATENTS

| Number | Country | Date |
| --- | --- | --- |
| 17,713 | Great Britain | Aug. 2, 1907 |
| 799,579 | France | June 15, 1936 |